ARTIFICIAL TRANSMISSION LINE NETWORK

Filed April 8, 1947 2 Sheets-Sheet 1

PRESTON ROBINSON
WILLIAM M. ALLISON
INVENTORS

BY Arthur G. Connolly

ATTORNEY

ARTIFICIAL TRANSMISSION LINE NETWORK

INVENTORS.
PRESTON ROBINSON &
WILLIAM M. ALLISON
BY
Arthur G. Connolly
THEIR ATTORNEY.

Patented Aug. 21, 1951

2,565,093

UNITED STATES PATENT OFFICE 2,565,093

ARTIFICIAL TRANSMISSION LINE NETWORK

Preston Robinson, Williamstown, and William M. Allison, North Adams, Mass., assignors to Sprague Electric Company, North Adams, Mass., a corporation of Massachusetts Application April 8, 1947, Serial No. 740,252

4 Claims. (Cl. 178—44)

This invention relates to new and improved electrical networks and more particularly refers to new types of construction for improved impedance matching, filtering, signal generating and signal delaying networks.

Electrical networks are well known in the art and generally consist of electrical circuits which contain one or more inductance, capacitance and in some cases, resistance elements so designed and connected to perform specific electrical functions. Among these functions are impedance-matching, filtering, signal generating, and signal delaying. These will be described in detail as the disclosure proceeds.

The conventional manner of producing networks has been to assemble a number of inductance, capacitance and sometimes resistance elements into a lumped parameter unit, which possesses somewhat distributed constants. Thus, an impedance-matching network, for example, may consist of three inductance coils in series and three condensers in parallel, so connected as to distribute the impedance change as evenly as possible.

It is an object of this invention to produce a novel electrical network designed to generate rectangular or other desired wave shapes without appreciable distortion. It is a further object to produce novel electrical networks designed to delay rectangular or other energy pulses without appreciable distortion. A still further object is to produce novel electrical networks designed to block specified waves and pass other specified waves without appreciable distortion. It is a further object to produce novel electrical networks which possess an infinitely distributed capacitative and inductive relationship. Additional objects will become apparent from the following description and claims.

In accordance with the present invention these objects are attained by the use of novel helical windings of foil-like electrodes. In a more restricted sense, the invention is concerned with convolutely wound electrodes separated by porous dielectric spacers at least one of these electrodes being so wound and connected as to provide an inductive effect in itself. In a still more restricted sense this invention is concerned with at least two convolutely wound electrodes separated by dielectric insulating material, at least one of said electrodes being inductively wound and connected, and at least one of said electrodes being so positioned as to effect a varying capacity relationship with another electrode. In a still more restricted sense this invention is concerned with an electrical network comprising convolutely wound electrodes separated by an impregnated porous dielectric spacer, at least one of said electrodes being wound non-inductively and, in some cases, one of said electrodes being wound so as to produce a progressively varied dielectric area between said electrode and another electrode. The invention is also concerned with methods of varying the inductive effect in an assembled unit.

One of the preferred embodiments of the invention concerns the novel methods of producing electrical networks by suitable winding processes, somewhat similar to those applied in making an electrical condenser. We have found that outstanding networks can be made utilizing the principles which we disclose herein, the networks being operable with substantially no distortion.

In all electrical networks employing inductance and capacitance elements in parallel, shunt and other relationships to each other, the inductance and capacity are preferably distributed infinitely throughout the network, to avoid distortion. This has heretofore been partially achieved by utilizing large numbers of individual elements. Contrary to this prior procedure, we achieve a considerably improved result employing fewer individual elements by novel methods of winding and terminating networks. In the following paragraphs, these novel methods will be discussed in detail.

Reference is made to the appended drawings, in which

Figure 1:
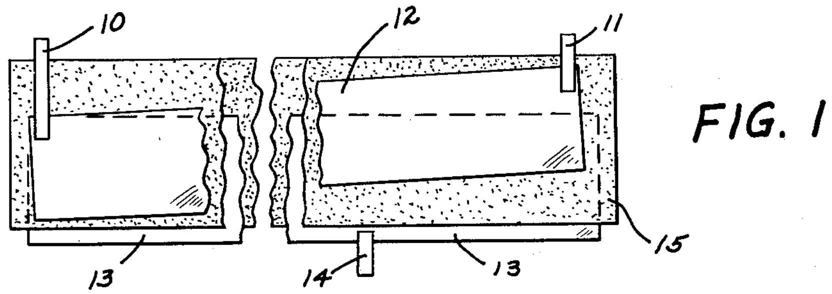
Figure 1 represents a plan view of a network of the invention before winding.

Referring more specifically to Figure 1, 12 represents a metal foil electrode, at the ends of which are connected terminal tabs 10 and 11. 15 represents a porous paper or other spacer employed to separate and insulate the electrodes. 13 represents the other electrode, also of metal foil. This foil may be, as illustrated, extended over one edge of the spacer 15 and folded and soldered after winding to form a non-inductive electrode to which terminal 14 is attached.

A network is formed by winding the so-arranged electrodes and spacers helically. In the simple network illustrated, an impedance-matching network would be produced by winding the constituents with terminal tab 10 on the inside of the winding. As shown in the drawing, the inductively wound electrode 12 is led off at a slight angle from the other electrode, or in other words, it is not wound on the mandrel at the customary angle of 90° therewith. The shaded area represents the actual overlap between the electrodes, or, the effective dielectric area. The purpose therefor will be described in detail in connection with Figures 2 and 3, but it is to be understood that this angle of leading off may be selected to fit the particular network which is being produced.

Figure 2:
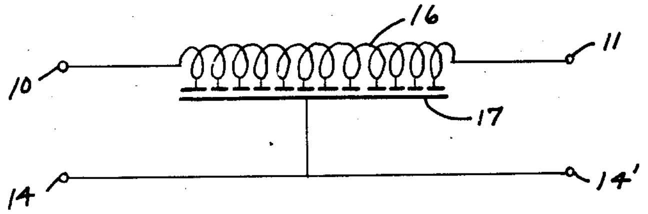
Figure 2 represents the schematic electrical circuit of a network of the invention.

Figure 2 represents the schematic electrical circuit of some of the preferred networks disclosed herein. 16 represents the inductive element, which in the case of the network described in Figure 1, is the inductively wound electrode 12. Terminals to this electrode are represented as 10 and 11. The capacitative element is represented as 17 and is equivalent to an infinite number of capacitative elements distributed along the inductance element. It is this latter equivalency that accounts for some of the heretofore unattainable properties found in the networks of the invention.

In the case of the impedance-matching network described in connection with Figure 1, the inductance per unit length increases slightly between terminals 10 and 11, because of the increase in diameter as the winding progresses. At the same time, the capacity per unit length decreases gradually and at a constant rate, since the "overlap" or dielectric area between the electrodes is constantly diminishing.

Figure 3:
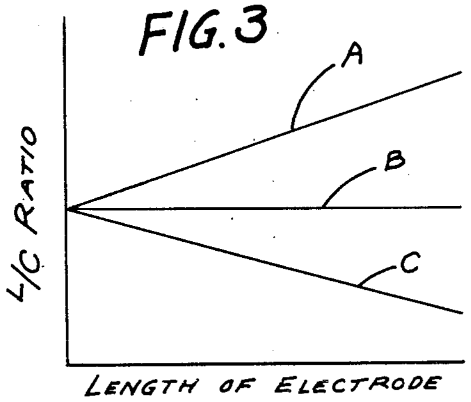
Figure 3 shows the inductance and capacitance curves for the network as the electrodes progress in length.

Referring now to Figure 3, the theoretical and actual characteristics of the networks of the invention will be described. The chart illustrated shows the ratio of inductance to capacity as a function of the length of foils or electrodes wound, from the start of the winding.

Three curves are shown, A, B and C, representing increasing, constant and decreasing $L/C$ ratios as the winding progresses. Networks with each of these characteristics are useful for particular applications.

Considering each type separately, we have found an increasing $L/C$ ratio may be achieved by reducing the electrode overlap area, as the winding progresses, at a rate sufficient to keep lowering the capacitance per unit length of electrode. Thus, assuming that the inductance per unit length changes only slightly (which is the actual case), the $L/C$ ratio increases.

In order to maintain the $L/C$ ratio constant, as desired in many circuits, it is necessary to consider the slight increase in inductance per unit length as the winding progresses. Thus, it is necessary to increase the capacitance per unit length slightly to maintain the constant ratio. This can be done readily by increasing the electrode overlap slightly as the winding progresses.

The third case occurs when it is desired to produce a decreasing $L/C$ ratio. This may be accomplished very readily by making a decided increase in the electrode overlap as the winding progresses. It is of course possible to switch the terminal connections on the first type, e. g. with an increasing $L/C$ ratio. The method of accomplishing this result may be selected on a basis of the ease of manufacture.

While Figure 1 has shown a simple method for varying the electrode overlap, there are other methods which are adaptable to manufacturing processes and which achieve the same electrical result. One of the foils may be cut to remove part of the area during the winding process. The dielectric may be increased or decreased in thickness during winding, thus affecting the capacity without changing the actual electrode foil overlap. If one or both of the electrodes are produced by evaporating a thin metal film on the paper, the paper may be suitably masked with a slit of varying width, making possible controlled variable electrode widths.

The networks of the invention possess the advantage of a constant rate of $L/C$ ratio change from one set of terminals to the other set of terminals.

It is also possible to vary the characteristics of the networks of the invention by varying the resistance of the electrode foils or the dielectric spacing material or both.

The surge impedance levels at the extremities of the network are factors governing the impedance-matching value of the network, provided the changes therebetween are uniform as described herein. The ratio of the surge impedance levels at the inner and outer extremities is approximately:

$$\sqrt{\frac{L\ \text{1st inch}}{C\ \text{1st inch}}}:\sqrt{\frac{L\ \text{final inch}}{C\ \text{final inch}}}$$

This is true when the diameter change is not too great. If, for example, the values are $$\sqrt{\frac{.1\times10^{-6}}{200\times10^{-12}}}:\sqrt{\frac{.12\times10^{-6}}{60\times10^{-12}}}$$

the ratio will be 1 to 2. If, also for example, such a network is to be used to match two impedance levels of 25 and 50 ohms, it will be constructed to possess the above ratio—and a surge impedance value $$Z=\frac{L}{C}$$

of 25 ohms at the inner terminal. From this example, it will readily be seen that the impedance-matching level desired can be obtained by selection of a suitable initial diameter, foil width and length angle of overlap lead-off, etc. However, any type of network produced in accordance with the invention will operate without the appreciable distortion which is normally found in the so-called lumped-parameter networks.

According to another embodiment of the invention, at least two electrodes in a network are wound inductively, so that the capacity is distributed along and between both of the inductive elements.

Figure 4:
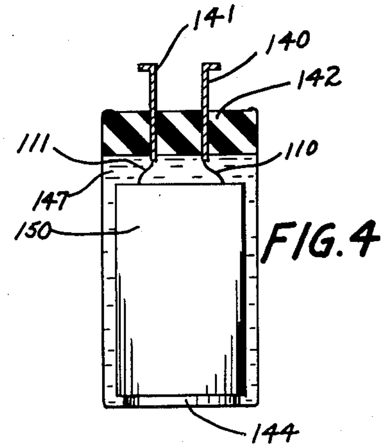
Figure 4 shows the cross-section of a completed network.

Figure 4 shows a completed network, produced by winding the network as indicated in Figure 1 and mounting it in a suitable container. In this figure, which is shown in cross-section, 150 represents the wound network whose non-inductively wound end 144 is placed on and soldered to the bottom of the metal container 152. The terminal tabs 110 and 111 are connected to terminal lugs 140 and 141, respectively. These lugs extend through an insulating and sealing disc 142 which may be of rubber, Bakelite, etc. The unit is impregnated with and partially surrounded by impregnant 147.

Figure 5:
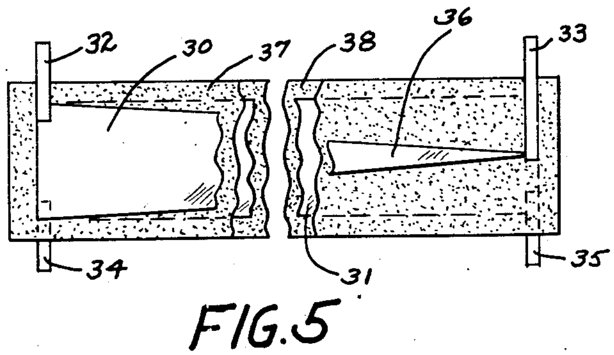
Figures 5, 6, 7 and 8 represent plan views of different forms of networks according to the invention.

Figure 5 shows a laid out four terminal network of the invention. In this figure, 30 represents one electrode foil which is tapered from one end to the other, narrowing appreciably as indicated by 36. It is provided with terminal tabs 32 and 33 at its extremities. This electrode may be produced by metallizing spacer 37, by cutting or folding a constant width foil or by other means. The other electrode foil 31, shown partially by dashed lines, is of a constant width and provided with terminal tabs 34 and 35 at its extremities. This foil is wound inductively (in contrast to foil 13 of Figure 1).

Dielectric spacers 37 and 38 separate the electrode foils in the usual manner. The convolutely wound network may operate as a four terminal network, with the input connected to tabs 32 and 34 and the output being connected to tabs 33 and 35. If the start of the winding is at the point where tabs 32 and 34 are provided, and these tabs are connected to the input circuit, an increasing *L/C* ratio will be apparent and the network may be used as an impedance matching transformer from a low input impedance to a high output impedance. Reversing the terminals will reverse the transforming function.

Electrode 30 may be tapered in a straight line, exponentially or otherwise, to give a constant or variable *L/C* ratio change rate per unit length of winding.

In some cases, terminal tabs may be longer and extend from both sides of the wound network roll. Also, the outer extremity of one electrode foil may be directly connected to the network container, if the latter is metallic, and the container can be directly connected to ground. By either of these means it is possible to reduce external inductance caused by terminal connections, thus improving the performance of the distortionless networks of the invention.

The drawings and descriptions thereof have been discussed particularly in connection with impedance-matching networks. The structural and theoretical details will apply similarly to other networks which have been disclosed as embodiments of the invention.

One of these preferred embodiments concerns the use of the networks of the invention as signal or pulse generating networks. It is often desirable to produce networks which, upon discharge, or short circuiting, will generate a rectangular wave front. In this particular type of network, the capacity and inductance ratios at any point in the network must be the same. Therefore, the overlap of the foils is increased as the diameter increases, but only to the extent necessary to maintain the same capacity for each millihenry of inductance as previously discussed. There are generally two terminals in signal generating or pulse-forming networks, corresponding to 10 and 14 in Figure 1.

In another embodiment of the invention, we have found that very outstanding pulse or signal delaying networks may be produced by varying the terminal design slightly. These networks should be symmetrical, that is, the inductive and capacitative relationship should remain constant as above. The capacitative relationship is selected as described above in connection with the pulse or signal generating network. There are three terminals, corresponding to 10, 11, and 14 in Figures 1 and 2.

For certain purposes a Blumlein network or circuit may be desirable. A network of this type is well-known and is defined as a pulse-forming network employed to generate a pulse with a voltage value twice that of the power source voltage. This is accomplished by interconnecting two networks of inductance-capacitance meshes in a cascade circuit, maintaining separate terminal connections to the common capacitor elements of each of the networks. See "Pulse Generators" by Glasoe and Lebacqz, pages 465 to 468, published by McGraw-Hill, 1948, and references therein mentioned.

Figure 6:
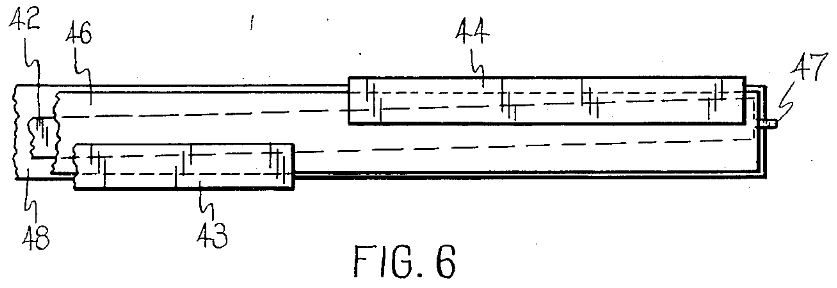

Figure 6 illustrates a Blumlein network or circuit formed by a set of wound foils in accordance with the invention. One inductive electrode 42 and two non-inductive electrodes 43, 44, are shown as arranged with suitable spacers 46, 48 for convolute winding. One non-inductive foil 43 extends over one side of the spacer 46, the other foil 44 extending over the other side of this spacer. The first and inner part of the winding would represent the second section of the Blumlein circuit, and comprise the inductively wound electrode and a short section electrode non-inductively wound electrode. The terminal connection to the inductively wound electrode 42 could be made at either extremity of the inductive foil, at or near the middle cylindrical surface of the winding as shown at 47, so that the terminal would not be physically too close to the outer non-inductively wound foil extension.

Similarly, it is apparent that high and low-pass filters, band-pass filters and other specified networks used in radio, telephone and telegraph communication are readily designed. Likewise, it is possible to design pulse or signal delay networks which will pass substantially all frequencies except those which are to be delayed.

Another type of network of the invention is one designed to function as an artificial transmission line, where the distributed capacity and inductance values are of particular importance. It is preferable that both electrodes in the network be wound inductively if the network is to correctly represent a transmission line, and three or four terminals employed.

In many cases it will be desirable to produce an electrical network whose impedance values, generated pulse shape, frequency pass band, etc. may be varied, depending, of course, upon the type of network in question. There are two general means for accomplishing the desired changes.

The first is to utilize a tapped inductive foil, with a suitable switching device, in place of a single or double terminal foil. By proper selection of the number of terminal tabs on the foil, and/or the continuity of the foil, and their positions, it is possible to vary the inductance and/or capacity value, and consequently, the electrical characteristics of the network.

To discuss the construction of the networks of the invention in greater detail, a consideration of the variables involved will now be made. The following list of variables will be discussed to further point out the broad scope of the invention and its departure from the prior art:

1. Composition of electrodes and dielectric medium;
2. Dimensions of electrodes;
3. Inner diameter of winding;
4. Relative positions of electrodes;
5. Type of winding;
6. Type of container and/or shield employed;
7. Number and position of terminals.

The electrode foils are generally made of aluminum, but lead, copper, tin and various other metals and alloys may be used with success. It is preferable to employ a metal or alloy of high electrical conductivity to avoid overheating of the unit and to permit higher operating efficiency but high resistance materials are useful for some purposes. The dielectric spacers, if employed, may be of calendered kraft paper or of other fibrous and/or porous dielectric materials such as glass wool, extruded "nylon," linen, hemp, etc. Substantially non-porous, resinous dielectric foils and films may also be employed, such as regenerated cellulose films, etc.

The dielectric impregnants for porous or other spacers may be solid, liquid and/or gaseous. Among polymerizable dielectrics which may be employed, compounds possessing a vinyl group are highly satisfactory, particularly when impregnated in the network in a substantialyl monomeric state and subsequently polymerized in situ.

Other dielectrics which may be used are capacitor oils; mineral oils; and, in general, liquids possessing low electrical losses at the frequencies and voltages encountered in operation. High loss dielectrics may be used for certain designs.

The dimensions of the electrode foils employed are important, and will be readily apparent to one familiar with this art from a consideration of the instructions hereof. When relatively high capacity and capacitative reactance are desired, the foils should be relatively wide. On the other hand, when relatively high inductance and inductive reactances are desired, the foils are generally narrower and longer.

Likewise, the inner diameter of the winding, and, in conjunction therewith, the foil and dielectric thickness are important. Larger inner diameters of the winding are advisable when the difference in capacity and/or inductive characteristics at each end of the winding is to be small. This may be accomplished by using a larger inner diameter which will require fewer turns of foil, which, in turn, will cause only a small difference in the value of inductance and/or capacity over the first and last turns. Conversely, when widely different impedance values are to be matched, or when, in general, the impedance value looking in one end is to be widely different from the value looking in the other end of the winding, the inner diameter should be small or negligible.

The relative position of the electrodes is of importance in obtaining the correct capacitative relationship along the inductance. The overlap, or dielectric area between the foils, may be varied by adjusting the angle of lead off or by other means as discussed previously. The angle of lead off is, of course, the angle between the edges of the foils at any point in the winding. The maximum width of the foil overlap may occur at the inner or the outer end of the winding. However, it is also possible to wind the foils in the usual parallel relationship for part of the winding and with a leading-off of one foil for the rest of the winding.

Figure 7:
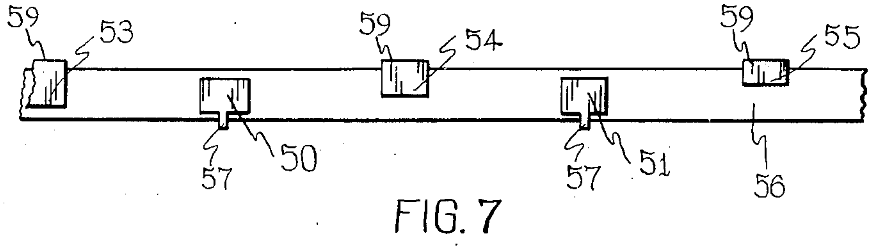

Several types of winding may be employed. Most common is the type usually used in winding condensers, wherein the number of layers and thickness of the dielectric spacers is selected to withstand the voltage stresess to be met in operation. For high voltage networks, however, the winding of relatively thick and/or numerous spacers becomes mechanically difficult and frequently results in wrinkled foils and spacers and a general unsuitable network. This difficulty and the poor results attendant therewith may be overcome by using a special type of "plate" winding, this requiring only a single paper spacer, which, however, is wound with several layers between the turns of the foils. Fig. 7 shows such a network in unrolled condition. The non-inductive electrode in this case comprises a series of individual foils 53, 54, 55, etc, and one edge of each of these foils extends beyond one side of the dielectric spacer 56 so that these edges may be soldered together in the usual manner. Individual inductive foils 50, 51 would be interconnected by a suitable arrangement of tabs 57.

The inductive characteristics may be varied slightly by suitable core and/or shield arrangements. While the previous discussion was concerned with a variable core and/or shield, it is apparent that outside electrical fields from radio tubes, transformers, chokes, connecting lines and the like will affect the inductive characteristics. Because of this it is often advisable to place a single or double shield about the network to avoid any distortion which might result from outside electrical fields.

The number and position of the terminals may be selected in accordance with the type of network desired. Terminals may be attached at one or both ends of the inductively wound foils, or, in special cases, at intermediate points in the winding. An artificial transmission line employing two inductively wound foils would require a terminal at each end of both of the inductively wound foils, while a signal generating network would require a single terminal usually at the inner end of the one inductively wound foil, and a single terminal from the non-inductively wound foil.

Having knowledge of the impedance, frequency passing and attenuation, pulse form, time of delay or other characteristics required in a network, the design thereof may be made in accordance with the instructions hereof by relatively simple mathematical calculations; for example, the capacity between foils in which the diameter of winding, width of overlap, etc. are continuously varying, may be found at any one turn, or in overall value, by application of calculus.

The networks of the invention possess the further advantage of being produced in a single integral unit, while prior networks of the lumped parameter type necessarily required a large volume because of the air space in and about the inductance elements, etc. The networks of the invention are economical, small in volume, compact and durable, particularly when a polymerizable resinous material is employed as an impregnant therein and subsequently polymerized.

Figure 8:
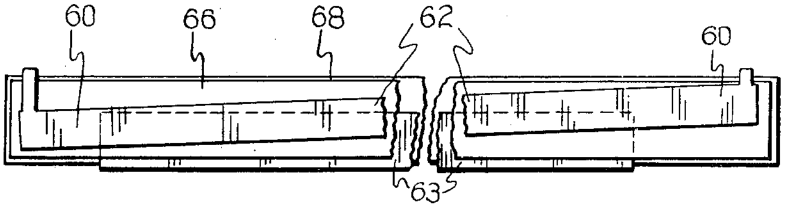

In some cases, where relatively high inductance is required, the inductively wound foil may be considerably longer than the other foil, extending beyond the latter at either one or both extremities of the winding. This type of winding is illustrated in Fig. 8 and is also of value in producing networks where a pure inductance section is desired in series with a network, giving a sharp resonance point. In Fig. 8, a non-inductive foil is shown at 63, an inductive foil at 62 and a set of spacers at 65, 68. Projecting ends 60 of the inductive foil extend beyond the ends of foil 63 and supply the desired additional inductance.

As many apparently widely different embodiments of the invention may be made without departing from the spirit and scope thereof, it is to be understood that the invention is not limited to the specific embodiments thereof except as limited by the appended claims.

What is claimed is:

1. A signal generating network comprising a convolutely wound non-inductive electrode, a convolutely wound inductive electrode and a dielectric medium separating the electrodes, the dielectric area being decreased as the winding progresses to an extent sufficient to maintain a constant relationship between the inductance and capacity per unit length of electrode, said decrease being effected by decreasing the overlap between the electrodes as the winding progresses, terminals being provided at one extremity of the inductively wound electrode and at the non-inductively wound electrode.

2. A signal delaying network comprising the network of claim 1, with terminals provided at both ends of the inductively wound electrode and at the non-inductively wound electrode.

3. An electrical network comprising a convolutely wound non-inductive electrode, and a convolutely wound inductive electrode, said electrodes being separated by a dielectric medium the area of which changes at a constant rate as the winding progresses.

4. An electrical network as defined in claim 3 in which the electrodes and the dielectric medium are all elongated rectangular ribbons, the non-inductive electrode ribbon is aligned with the dielectric ribbon, and the inductive electrode ribbon is wound at an acute angle with respect to the dielectric ribbon.

PRESTON ROBINSON.
WILLIAM M. ALLISON.

REFERENCES CITED

The following references are of record in the file of this patent:

UNITED STATES PATENTS

| Number | Name | Date |
|---|---|---|
| 2,000,441 | Given | May 7, 1935 |
| 2,027,067 | Schubert | Jan. 7, 1936 |
| 2,126,915 | Norton | Aug. 16, 1938 |
| 2,362,470 | De Rosa | Nov. 14, 1944 |
| 2,411,555 | Rogers | Nov. 26, 1946 |
| 2,440,652 | Beverly | Apr. 27, 1948 |